United States Patent
Gouko

(10) Patent No.: US 10,474,309 B2
(45) Date of Patent: Nov. 12, 2019

(54) CONDUCTIVE ELEMENT, INPUT DEVICE, AND ELECTRONIC APPARATUS

(71) Applicant: Sony Corporation, Tokyo (JP)

(72) Inventor: Takeshi Gouko, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/097,512

(22) PCT Filed: Apr. 3, 2017

(86) PCT No.: PCT/JP2017/013958
§ 371 (c)(1),
(2) Date: Oct. 29, 2018

(87) PCT Pub. No.: WO2017/195500
PCT Pub. Date: Nov. 16, 2017

(65) Prior Publication Data
US 2019/0129542 A1    May 2, 2019

(30) Foreign Application Priority Data
May 10, 2016  (JP) ................. 2016-094539

(51) Int. Cl.
G06F 3/047    (2006.01)
G06F 3/044    (2006.01)
G06F 3/041    (2006.01)

(52) U.S. Cl.
CPC .............. *G06F 3/047* (2013.01); *G06F 3/044* (2013.01); *G06F 3/0412* (2013.01); *G06F 3/04164* (2019.05); *G06F 2203/04103* (2013.01)

(58) Field of Classification Search
CPC .......... G06F 3/047; G06F 3/0412; G06F 3/044
USPC ........................................... 174/257
See application file for complete search history.

(56) References Cited

U.S. PATENT DOCUMENTS

| | | | | |
|---|---|---|---|---|
| 6,046,500 A | * | 4/2000 | Fey ................ | C08J 7/123 257/642 |
| 2008/0135842 A1 | * | 6/2008 | Kim ................ | G03F 7/0048 257/59 |
| 2009/0020751 A1 | | 1/2009 | Seki et al. | |
| 2013/0220680 A1 | | 8/2013 | Tazawa et al. | |

FOREIGN PATENT DOCUMENTS

| | | |
|---|---|---|
| JP | 2004-281184 | 10/2004 |
| JP | 2004-281184 A | 10/2004 |
| JP | 2005-086188 | 3/2005 |
| JP | 2005-086188 A | 3/2005 |
| JP | 2013-045261 | 3/2013 |
| JP | 2013-045261 A | 3/2013 |
| JP | 2014-026584 | 2/2014 |
| JP | 2014-026584 A | 2/2014 |
| WO | 99/48339 A1 | 9/1999 |
| WO | 2012/053625 A1 | 4/2012 |

OTHER PUBLICATIONS

International Search Report and Written Opinion issued in connection with International Patent Application No. PCT/JP2017/013958, dated Jun. 13, 2017. (9 pages).

* cited by examiner

*Primary Examiner* — Sherman Ng
(74) *Attorney, Agent, or Firm* — K&L Gates LLP

(57) ABSTRACT

A conductive element includes: a base material having a fluorine-containing surface; and a wire disposed on the surface. Detection intensity of fluorine on the base material surface is 96834 cps or more.

11 Claims, 12 Drawing Sheets

A

B

A

B

A

B

C

FLUORINE: 5vol%
THICKNESS: 3.2μm
WIDTH: 113μm
CROSS-SECTIONAL AREA: 204μm²

A

B

C

FLUORINE: 25vol%
THICKNESS: 4.6 μm
WIDTH: 90 μm
CROSS-SECTIONAL AREA: 222 μm²

A

B

C

NO TREATMENT
THICKNESS: 1.9 μm
WIDTH: 245 μm

CONDUCTIVE ELEMENT, INPUT DEVICE, AND ELECTRONIC APPARATUS

CROSS-REFERENCE TO RELATED APPLICATIONS

The present application claims the benefit of International Application No. PCT/JP2017/013958, filed Apr. 3, 20107, which claims priority to Japanese Application No. 2016-094539, filed May 10, 2016, the disclosures of which are incorporated herein by reference.

BACKGROUND

The present technology relates to a conductive element, an input device including the conductive element, and an electronic apparatus including the conductive element. Specifically, the present technology relates to a conductive element including a wire.

In recent years, in order to narrow a frame of a smartphone, a tablet computer, or the like, a demand for thinning (narrowing) a wire is increasing. For example, Patent Document 1 proposes technology of forming a routing wire connecting a transparent electrode to an external circuit on a touch panel by performing a drying treatment or a firing treatment after a conductive paste is printed.

SUMMARY

Problems to be Solved by the Invention

An object of the present technology is to provide a conductive element including a thinned wire, an input device including the conductive element, and an electronic apparatus including the conductive element.

Solutions to Problems

In order to solve the above problems, a first technique is a conductive element including a base material having a fluorine-containing surface and a wire disposed on the surface, in which detection intensity of fluorine on the surface is 96834 cps or more.

A second technique is a conductive element including a base material having a fluorine-containing surface and a wire disposed on the surface, in which a water contact angle on the surface is 100 degrees or more.

A third technique is an input device including the conductive element of the first or second technique.

A fourth technique is an electronic apparatus including the conductive element of the first or second technique.

Effects of the Invention

As described above, the present technology can realize a conductive element including a thinned wire.

DETAILED DESCRIPTION

An embodiment of the present technology will be described in the following order.
1. Configuration of electronic apparatus
2. Method for manufacturing conductive element
3. Effect
4. Modification Example

1. Configuration of Electronic Apparatus

Figure 1:
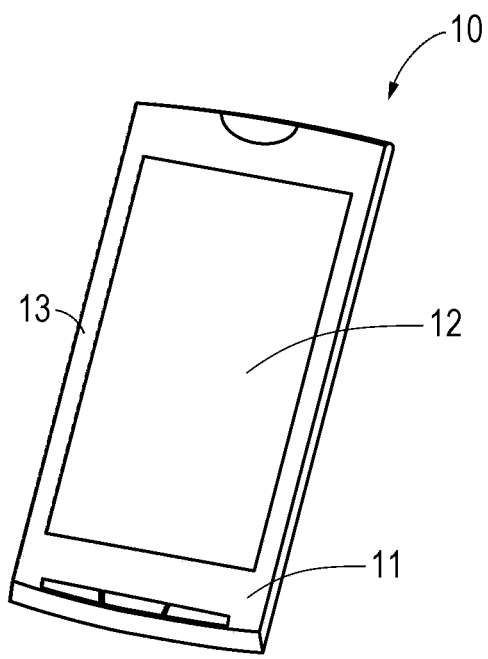
FIG. 1 is a perspective view illustrating an example of the appearance of an electronic apparatus according to an embodiment of the present technology.
Figure 2:
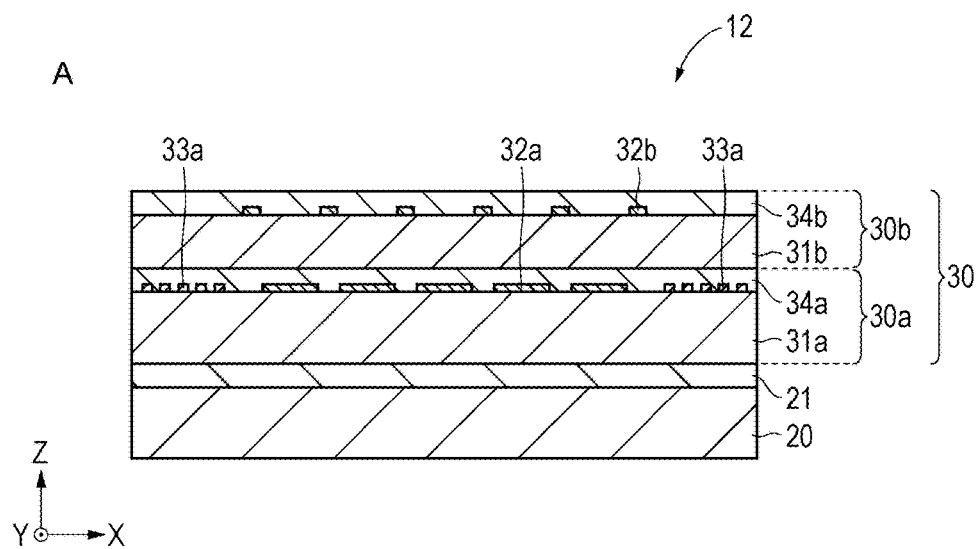
FIG. 2A is a cross-sectional view illustrating an example of the configuration of a touch panel type display device.
FIG. 2B is an exploded perspective view illustrating an example of the configuration of an input device.
Figure 2:
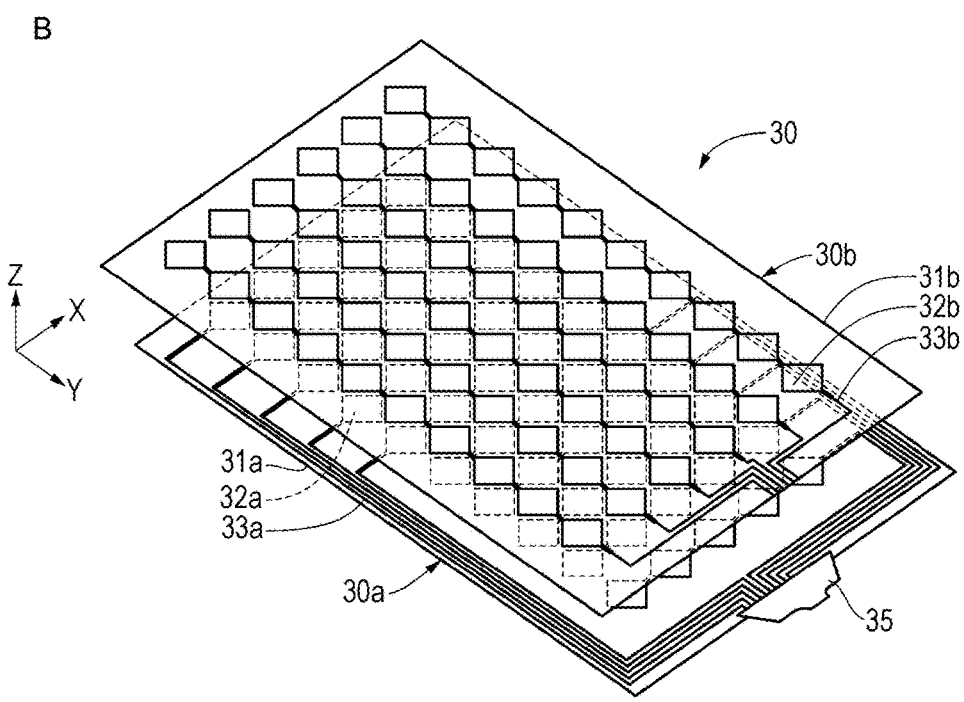

As illustrated in FIG. 1, an electronic apparatus 10 according to the embodiment of the present technology is a so-called smartphone, and includes a housing 11 and a touch panel type display device 12 housed in the housing 11. As illustrated in FIG. 2A, the touch panel type display device 12 includes a display element 20 and an input device 30 disposed on a display surface of the display element 20. The display element 20 and the input device 30 are bonded to each other via a bonding layer 21 including, for example, an adhesive or the like.

(Display Element)

As the display element 20, for example, various display elements such as a liquid crystal display element and an organic electroluminescence (hereinafter referred to as "EL") element can be used.

(Input Device)

The input device 30 is a so-called projection type electrostatic capacitance touch panel. As illustrated in FIGS. 2A and 2B, the input device 30 includes a first transparent conductive element 30a and a second transparent conductive element 30b disposed on the first transparent conductive element 30a. The first transparent conductive element 30a and the second transparent conductive element 30b are bonded to each other with a bonding layer (not illustrated) interposed therebetween. In addition, a protective layer may be disposed on a surface of the second transparent conductive element 30b on an input surface side, if necessary. A shield layer may be disposed on a surface of the first transparent conductive element 30a on a side of the display element 20, if necessary. Here, two directions orthogonally crossing each other in a plane of an input surface of the input device 30 are defined as an X-axis direction (first direction) and a Y-axis direction (second direction). In addition, a direction perpendicular to the input surface of the input device 30 is defined as a Z-axis direction (third direction).

(First and Second Transparent Conductive Elements)

As illustrated in FIGS. 2A and 2B, the first transparent conductive element 30a includes a base material 31a, a plurality of transparent electrodes 32a and a plurality of wires 33a disposed on one surface of the base material 31a, and an insulating layer 34a disposed on the one surface of the base material 31 so as to cover the transparent electrodes 32a and the wires 33a. As illustrated in FIGS. 2A and 2B, the second transparent conductive element 30b includes a base material 31b, a plurality of transparent electrodes 32b and a plurality of wires 33b disposed on one surface of the base material 31b, and an insulating layer 34b disposed on the one surface of the base material 31b so as to cover the transparent electrodes 32b and the wires 33b. Note that the insulating layers 34a and 34b are not illustrated in FIG. 2B. A flexible printed circuit (FPC) 35 is disposed on a periphery of the first transparent conductive element 30a and the second transparent conductive element 30b bonded to each other.

(Base Material)

Each of the base materials 31a and 31b contains fluorine on at least one surface thereof. Detection intensity of fluorine on one surface of each of the base materials 31a and 31b is 96834 cps or more, preferably 96834 cps or more and 200000 cps or less, and more preferably 149381 cps or more and 200000 cps or less. The detection intensity of fluorine of 96834 cps or more can sufficiently increase a water contact angle (specifically, a contact angle of a solvent contained in a conductive ink), and therefore can thin the wires 33a and 33b. Meanwhile, the detection intensity of fluorine of 200000 cps or less can suppress a decrease in adhesion force of the wires 33a and 33b to the base materials 31a and 31b, respectively.

The detection intensity of fluorine on one surface of the base material 31a is measured as follows. First, depth direction analysis (depth profile measurement) of the first transparent conductive element 30a is performed by X-ray photoelectron spectroscopy (XPS) while ion milling is performed from the insulating layer 34a side of the first transparent conductive element 30a. At this time, a position at which the detection intensity of fluorine is maximum is regarded as a surface of the base material 31a, and the detection intensity of fluorine at this position is defined as "detection intensity of fluorine on one surface of the base material 31a".

The detection intensity of fluorine on one surface of the base material 31b is also measured in a similar manner to the detection intensity of fluorine on one surface of the base material 31a.

A water contact angle on one surface of each of the base materials 31a and 31b is 100 degrees or more, preferably 100 degrees or more and 120 degrees or less, and more preferably 110 degrees or more and 120 degrees or less. The contact angle of 100 degrees or more can sufficiently increase a water contact angle (specifically, the contact angle of a solvent contained in a conductive ink), and therefore can thin the wires 33a and 33b. Meanwhile, the contact angle of 120 degrees or less can suppress a decrease in adhesion force of the wires 33a and 33b to the base materials 31a and 31b, respectively.

Fluorine is preferably deposited on one surface of each of the base materials 31a and 31b. This is because the water contact angle (specifically, the contact angle of a solvent contained in a conductive ink) can be sufficiently increased, thereby further improving the degree of thinning of the wires 33a and 33b. Fluorine deposited on one surface of each of the base materials 31a and 31b may constitute a thin film. Arithmetic average roughness Ra on one surface of each of the base materials 31a and 31b is 2 nm or less, for example.

Each of the base materials 31a and 31b is preferably a flexible film. This is because the first and second transparent conductive elements 30a and 30b can be manufactured by roll to roll, thereby improving production efficiency. One surface of each of the base materials 31a and 31b is preferably subjected to an easy adhesion treatment. This is because adhesion of the wires 33a and 33b can be improved.

As a material of the base materials 31a and 31b, for example, one or more polymer resins selected from polyethylene terephthalate (PET), polyethylene (PE), polypropylene (PP), polycarbonate (PC), polyimide (PI), triacetate (TAC), polyethylene naphthalate (PEN), aramid, an acrylic resin, polyester (TPEE), polyamide (PA), a cycloolefin polymer (COP), a cycloolefin copolymer (COC), an epoxy resin, a urea resin, a urethane resin, a melamine resin, and the like are mentioned. Among these resins, one or more resins selected from polypropylene, polyimide, polyethylene naphthalate, aramid, and the like are preferable, and polyimide is most preferable from a viewpoint of heat resistance. The thickness of each of the base materials 31a and 31b is preferably 3 μm to 500 μm from a viewpoint of productivity, but is not particularly limited to this range.

The base material 31a may have a single layer structure or a layer structure of two or more layers. Examples of the base material 31 having a layer structure of two or more layers include a base material including a base material layer and a surface layer disposed on at least one surface of the base material layer. In this case, as materials of the base material layer and the surface layer, the materials exemplified above as the materials of the base materials 31a and 31b can be used.

(Transparent Electrode)

The transparent electrodes 32a are X electrodes extending in the X-axis direction and are arranged so as to be separated from each other at predetermined intervals in the Y-axis direction. Meanwhile, the transparent electrodes 32b are Y electrodes extending in the Y-axis direction and are arranged so as to be separated from each other at predetermined intervals in the X-axis direction.

Figure 3:
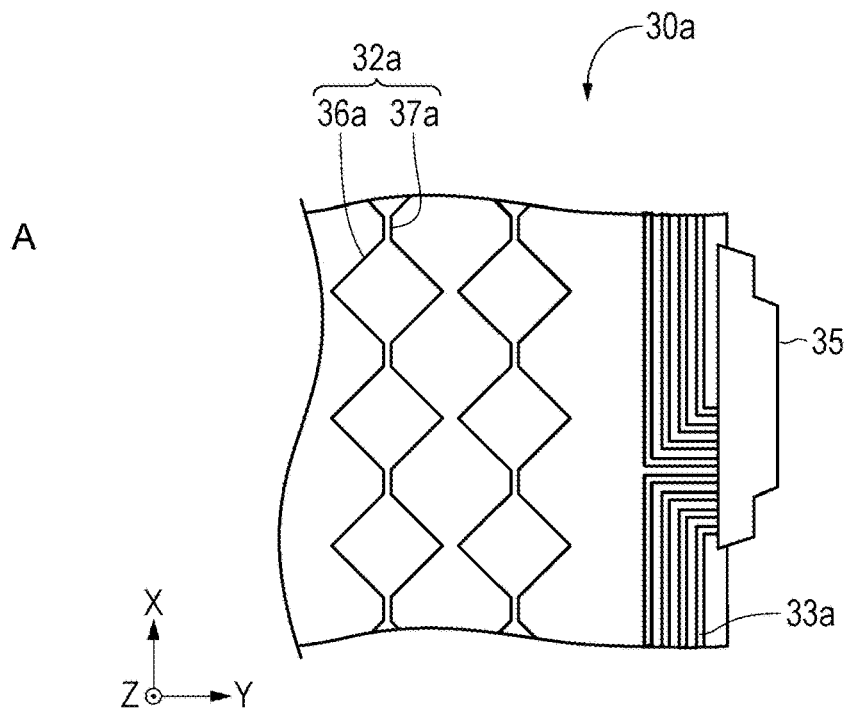
FIG. 3A is a plan view illustrating an example of the configuration of a first transparent conductive element.
FIG. 3B is a plan view illustrating an example of the configuration of a second transparent conductive element.
Figure 3:
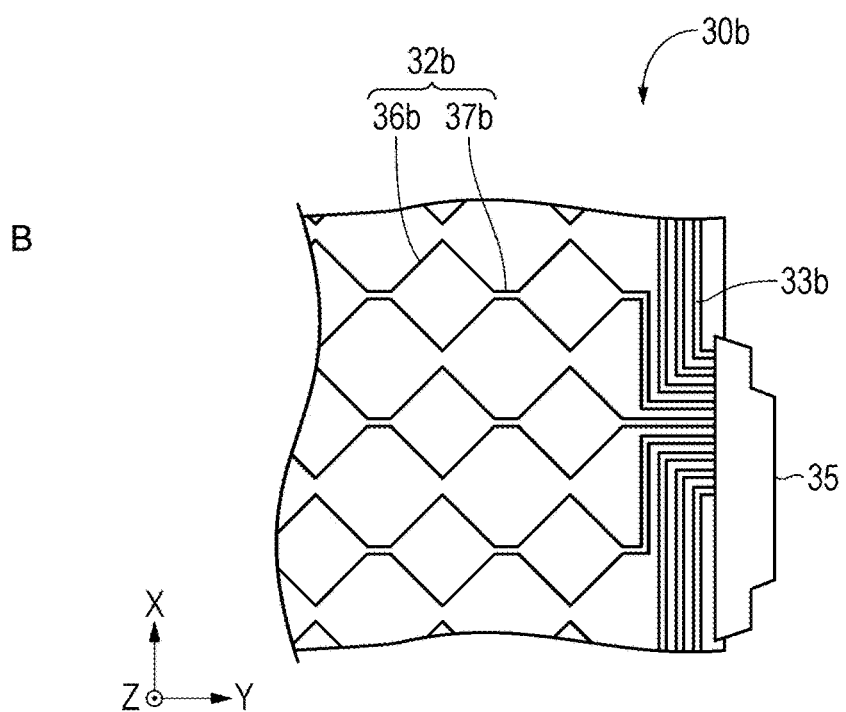

As illustrated in FIG. 3A, each of the transparent electrodes 32a includes a plurality of pad portions (unit electrode bodies) 36a disposed at predetermined intervals in the X-axis direction and a plurality of connecting portions 37a connecting the pad portions 36a adjacent to each other in the X-axis direction. The pad portions 36a and the connecting portions 37a are integrally formed. As illustrated in FIG. 3B, each of the transparent electrodes 32b includes a plurality of pad portions (unit electrode bodies) 36b disposed at predetermined intervals in the Y-axis direction and a plurality of connecting portions 37b connecting the pad portions 36b adjacent to each other in the Y-axis direction. The pad portions 36b and the connecting portions 37b are integrally formed.

When the transparent electrodes 32a and 32b are viewed from the Z-axis direction in plan view, the transparent electrodes 32a and 32b orthogonally cross each other such that the connecting portions 37a and 37b overlap with each other, and the pad portions 36a and 36b are laid in the XY plane. As the shape of each of the pad portions 36a and 36b, for example, a polygonal shape such as a rhombic shape (diamond shape) or a rectangular shape, a star shape, a cross shape, a mesh shape, or the like can be used, but the shape of each of the pad portions 36a and 36b is not limited thereto. FIGS. 2B, 3A, and 3B exemplify a case where each of the pad portions 36a and 36b has a rhombic shape. Note that the shape of each of the transparent electrodes 32a and 32b may be linear. In this case, the plurality of transparent electrodes 32a and 32b has a stripe shape orthogonally crossing each other when viewed from the Z-axis direction in plan view.

As materials of the transparent electrodes 32a and 32b, for example, one or more materials selected from the group consisting of a metal oxide material having electrical conductivity, a metal material, a carbon material, a conductive polymer, and the like can be used. Examples of the metal oxide material include indium tin oxide (ITO), zinc oxide, indium oxide, antimony-added tin oxide, fluorine-added tin oxide, aluminum-added zinc oxide, gallium-added zinc oxide, silicon-added zinc oxide, a zinc oxide-tin oxide-based compound, an indium oxide-tin oxide-based compound, a zinc oxide-indium oxide-magnesium oxide-based compound, and the like. Examples of the metal material include metal nanoparticles and particles of a metal wire, or the like. Examples of a material constituting these particles include metals such as copper, silver, gold, platinum, palladium, nickel, tin, cobalt, rhodium, iridium, iron, ruthenium, osmium, manganese, molybdenum, tungsten, niobium, tantelum, titanium, bismuth, antimony, and lead, alloys thereof, and the like. Examples of the carbon material include carbon black, a carbon fiber, fullerene, graphene, a carbon nanotube, a carbon microcoil, nanohorn, and the like. Examples of the conductive polymer include a substituted or unsubstituted polyaniline, polypyrrole, polythiophene, a (co)polymer containing one or two compounds selected therefrom, and the like.

(Wire)

Each of the wires 33a is a routing wire for electrically connecting each of the transparent electrodes 32a to the FPC 35. Each of the wires 33a is drawn out from one end of the transparent electrode 32a, drawn around a periphery of the base material 31a, and connected to the FPC 35. Each of the wires 33b is a routing wire for electrically connecting each of the transparent electrodes 32b to the FPC 35. Each of the wires 33b is drawn out from one end of the transparent electrode 32b, drawn around a periphery of the base material 31b, and connected to the FPC 35.

The wires 33a contain powder of metal particles. The wires 33a may further contain at least one of a binder such as a thermoplastic resin and an additive, if necessary.

The metal particles contain at least one of gold (Au), silver (Ag), copper (Cu), titanium (Ti), tungsten (W), molybdenum (Mo), indium (In), aluminum (Al), and nickel (Ni), for example. Examples of the shape of each of the metal particles include a spherical shape, an ellipsoidal shape, a needle shape, a plate shape, a scale shape, a wire shape, a rod shape, an irregular shape, and the like, but are not limited thereto.

A width w of each of the wires 33a and 33b is preferably 200 μm or less, more preferably 150 μm or less, and still more preferably 100 μm or less. When the width w of each of the wires 33a and 33b is 200 μm or less, the wires 33a and 33b can be sufficiently narrowed (densified). Therefore, a frame 13 of the electronic apparatus 10 can be sufficiently narrowed. In addition, when the width w of each of the wires 33a and 33b is 200 μm or less, non-visibility of the wires 33a and 33b (that is, transparency of a region where the wires 33a and 33b are disposed) can also be improved.

The thickness t of each of the wires 33a and 33b is preferably 1.9 μm or more, more preferably 1.9 μm or more and 10.0 μm or less, and still more preferably 3.5 μm or more and 9.0 μm or less. When the thickness t of each of the wires 33a and 33b is 1.9 μm or more, resistance of the wires 33a and 33b can be reduced. Meanwhile, it is difficult to increase the thickness t of each of the wires 33a and 33b to a value larger than 10.0 μm. A sufficiently low resistance value can be obtained without increasing the thickness t of each of the wires 33a and 33b to a value larger than 10.0 μm. Here, in a case where the thickness t of each of the wires 33a and 33b fluctuates in a width direction thereof, the thickness of each of the wires 33a and 33b means a maximum thickness of each of the wires 33a and 33b in the width direction.

An aspect ratio (thickness t/width w) of each of the wires 33a and 33b is preferably 0.03 or more, more preferably 0.03 or more and 0.10 or less, and still more preferably 0.06 or more and 0.10 or less. The aspect ratio of 0.03 or more can narrow the wires 33a and 33b while maintaining low resistance of the wires 33a and 33b. Meanwhile, it is difficult to increase the aspect ratio to a value larger than 0.10.

The resistance value of each of the wires 33a and 33b is preferably 1.0 Ω/mm or less. This is because the resistance value of 1.0 Ω/mm or less makes it possible to use the wires 33a and 33b for various electronic apparatuses including the input device 30.

(Insulating Layer)

As a material of the insulating layers 34a and 34b, either an inorganic material or an organic material may be used. As the inorganic material, for example, $SiO_2$, SiNx, SiON, $Al_2O_3$, $Ta_2O_5$, $Y_2O_3$, $HfO_2$, HfAlO, $ZrO_2$, $TiO_2$ and the like can be used. Examples of the organic material include a polyacrylate such as polymethyl methacrylate (PMMA), polyvinyl alcohol (PVA), polystyrene (PS), transparent polyimide, polyester, epoxy, polyvinyl phenol, polyvinyl alcohol, and the like.

2. Method for Manufacturing Transparent Conductive Element

Next, a method for manufacturing the first transparent conductive element 30a will be described. Note that a method for manufacturing the second transparent conductive element 30b is similar to the method for manufacturing the first transparent conductive element 30a, and therefore only the method for manufacturing the first transparent conductive element 30a will be described here.

(Plasma Treatment)

First, while the base material 31a is conveyed, one surface of the base material 31a is subjected to a plasma water-repellent treatment. Here, the plasma water-repellent treatment refers to a treatment of imparting water-repellency to one surface of the base material 31a by subjecting the one surface of the base material 31a to a plasma treatment. A plasma treatment apparatus for performing a plasma water-repellent treatment is preferably an apparatus which can perform a plasma treatment under atmospheric pressure from a viewpoint of productivity. As a process gas, a gas containing fluorine is used. As a power source, a pulse power source can be used.

At this time, the plasma water-repellent treatment is adjusted such that detection intensity of fluorine on one surface of the base material 31a is 96834 cps or more, preferably 96834 cps or more and 200000 cps or less, and more preferably 149381 cps or more and 200000 cps or less. In addition, only a region where the wire 33a is formed may be subjected to the plasma water-repellent treatment.

The plasma water-repellent treatment is adjusted such that a water contact angle on one surface of the base material 31a is 100 degrees or more, preferably 100 degrees or more and 120 degrees or less, and more preferably 110 degrees or more and 120 degrees or less.

(Formation of Transparent Electrode)

Next, the transparent electrode 32a is formed on one surface of the base material 31a fed out from a raw material. Examples of a method for forming a pattern of the transparent electrode 32a include a photolithography method and a printing method. Here, a case where the transparent electrode 32a is formed on one surface of the base material 31a after the plasma treatment will be described, but the transparent electrode 32a may be previously formed on one surface of the base material 31a before the plasma treatment.

(Printing)

Next, a conductive ink is printed on one surface of the base material 31a while the base material 31a is conveyed. The conductive ink contains powder of the above-described metal particles and a solvent. The conductive ink may contain at least one of a binder such as a thermoplastic resin and an additive, if necessary. Note that a conductive paste may be used instead of the conductive ink.

As the solvent, a solvent which can disperse powder of metal particles can be used. For example, at least one or more selected from water, an alcohol (for example, methanol, ethanol, n-propanol, i-propanol, n-butanol, i-butanol, sec-butanol, tert-butanol, or the like), an anone (for example, cyclohexanone or cyclopentanone), an amide (for example, N,N-dimethylformamide: DMF), a sulfide (for example, dimethylsulfoxide: DMSO), and the like is used.

By further adding a high boiling point solvent to the conductive ink, an evaporation rate of a solvent from the conductive ink may be controlled. Examples of the high boiling point solvent include butyl cellosolve, diacetone alcohol, butyl triglycol, propylene glycol monomethyl ether, propylene glycol monoethyl ether, ethylene glycol monoethyl ether, ethylene glycol monopropyl ether, ethylene glycol monoisopropyl ether, diethylene glycol monobutyl ether, diethylene glycol monoethyl ether, diethylene glycol monomethyl ether diethylene glycol diethyl ether, dipropylene glycol monomethyl ether, tripropylene glycol monomethyl ether, propylene glycol monobutyl ether, propylene glycol isopropyl ether, dipropylene glycol isopropyl ether, tripropylene glycol isopropyl ether, and methyl glycol. These high boiling point solvents may be used singly or in combination of two or more kinds thereof.

Examples of the printing method include flexographic printing, screen printing, gravure printing, gravure offset printing, reverse offset printing, waterless flat printing, inkjet printing, and the like.

(Drying Firing)

Next, by conveying the base materials 31a and 31b to a heating furnace and causing the base materials 31a and 31b to pass through the heating furnace, a solvent contained in the printed conductive ink is volatilized, and the conductive ink is dried and fired. Examples of the heating furnace include an infrared heating furnace, a heater heating furnace, a hot air circulation type heating furnace, and the like.

A process from the plasma treatment step to the drying and firing step is preferably performed by a roll to roll method. This is because productivity can be improved.

3. Effect

The electronic apparatus 10 according to the embodiment of the present technology includes the first and second transparent conductive elements 30a and 30b. The first and second transparent conductive elements 30a and 30b include the base materials 31a and 31b containing fluorine on one surface thereof and a plurality of wires 33a and 33b disposed on one surface of the base materials 31a and 31b, respectively. Detection intensity of fluorine on one surface of each of the base materials 31a and 31b is 96834 cps or more. Therefore, a water contact angle on one surface of each of the base materials 31a and 31b can be sufficiently large, thereby thinning the wires 33a and 33b. Therefore, it is possible to narrow the frame 13 of the electronic apparatus 10, and to enlarge a display surface of the touch panel type display device 12.

In the method for manufacturing a transparent conductive element according to the embodiment of the present technology, a conductive ink is printed on one surface of each of the base materials 31a and 31b, the one surface having been subjected to a plasma water-repellent treatment. Therefore, it is possible to suppress wetting and spreading of the conductive ink on the one surface of each of the base materials 31a and 31b. Therefore, the wires 33a and 33b can be thinned. In addition, the thicknesses of the wires 33a and 33b can also be ensured, and therefore the wires 33a and 33b of low resistance can be obtained.

4. Modification Example

The wire and the conductive ink may contain carbon particles instead of or in combination with the metal particles. As the carbon particles, for example, one or more kinds of carbon particles selected from fullerene, graphene, carbon nanotube, and the like can be used.

In the above-described embodiment, the example in which a base material surface is made water-repellent by introducing fluorine onto the base material surface using a plasma treatment has been described. However, by introducing fluorine onto the base material surface by a method other than the plasma treatment, the base material surface may be made water-repellent.

In the above-described embodiment, the example in which the present technology is applied to the transparent conductive element of the electrostatic capacitance touch panel has been described. However, the present technology is not limited to this example, and may be applied to various conductive elements including wires. Specific examples of the conductive element to which the present technology can be applied include a transparent conductive element such as a resistance film type touch panel, an IC card, a display element (for example, a liquid crystal display element, an organic EL element, an inorganic EL element, electronic paper, or the like), a printed wiring board, a printed circuit board, and the like. Here, the term "printed wiring board" means a board including no electronic component but including only a wire. In addition, the term "printed circuit board" means a board including an electronic component together with a wire to operate as an electronic circuit. Note that the type of the board is not particularly limited in the printed wiring board and the printed circuit board, and any one of a flexible board, a rigid board, and a rigid flexible board may be used.

In the above-described embodiment, the example in which the present technology is applied to the frame wire of the input device has been described, but the present technology can also be applied to a wire other than the frame wire. In addition, the present technology can also be applied to formation of an electrode pattern having a matrix shape or the like. In this case, since the electrode can be thinned (narrowed), non-visibility of the electrode can be improved.

The input device may include a transparent conductive element in which transparent electrodes and wires are disposed on both surfaces instead of the first and second transparent conductive elements in each of which transparent electrodes and wires are disposed on one surface. In this case, the input device can be further thinned.

EXAMPLES

Hereinafter, the present technology will be described specifically with Examples, but the present technology is not limited only to these Examples.

Examples 1-1 and 1-2 and Comparative Examples 1-1 to 1-3

(Plasma Treatment)

First, a raw material of a 250 μm thick PET film (A4300 manufactured by Toyobo Co., Ltd.) which had been subjected to a double-sided easy adhesion treatment was attached to a roll to roll type atmospheric pressure plasma treatment apparatus. Next, one surface of the PET film fed out from the raw material was subjected to a plasma water-repellent treatment, and then the film was wound up. As a process gas, a mixture of fluorine and nitrogen was used, and a mixing ratio was changed for each sample. As a power source, a pulse power source was used.

Next, an element composition on one surface of the PET film was analyzed by XPS (ESCA-3400 manufactured by Shimadzu Corporation), and detection intensity of fluorine was determined. Measurement conditions of XPS are illustrated below.

X-ray source: magnesium
X-ray high pressure value: 8 kV
Emission current value: 20 mA
Analysis range: φ6 mm (Printing)

Next, the raw material obtained by subjecting one surface of the PET film to a plasma water-repellent treatment was attached to a flexographic printing apparatus. Thereafter, a wire was printed with a conductive ink on one surface of the PET film fed out from the raw material. As the conductive ink, XA-3609 (low viscosity 7700 mpa·s) manufactured by Fujikura Kasei Co., Ltd. was used. As a flexographic plate (letterpress), a plate having a line width of 25 μm (manufactured by Komura-Tech Co., Ltd.) was used.

(Drying)

Next, the PET film on which the conductive ink had been printed was conveyed to a heating oven at 120° C., and conveyed inside the oven over 30 minutes. The printed conductive ink was thereby dried and fired, and then the PET film was wound up. In this way, a desired wire film (conductive element) was obtained.

(Measurement of Wire Width)

The wire width of the wire film obtained as described above was measured using a laser microscope (LEXT OLS4000 manufactured by Olympus Corporation).

(Result)

Figure 4:
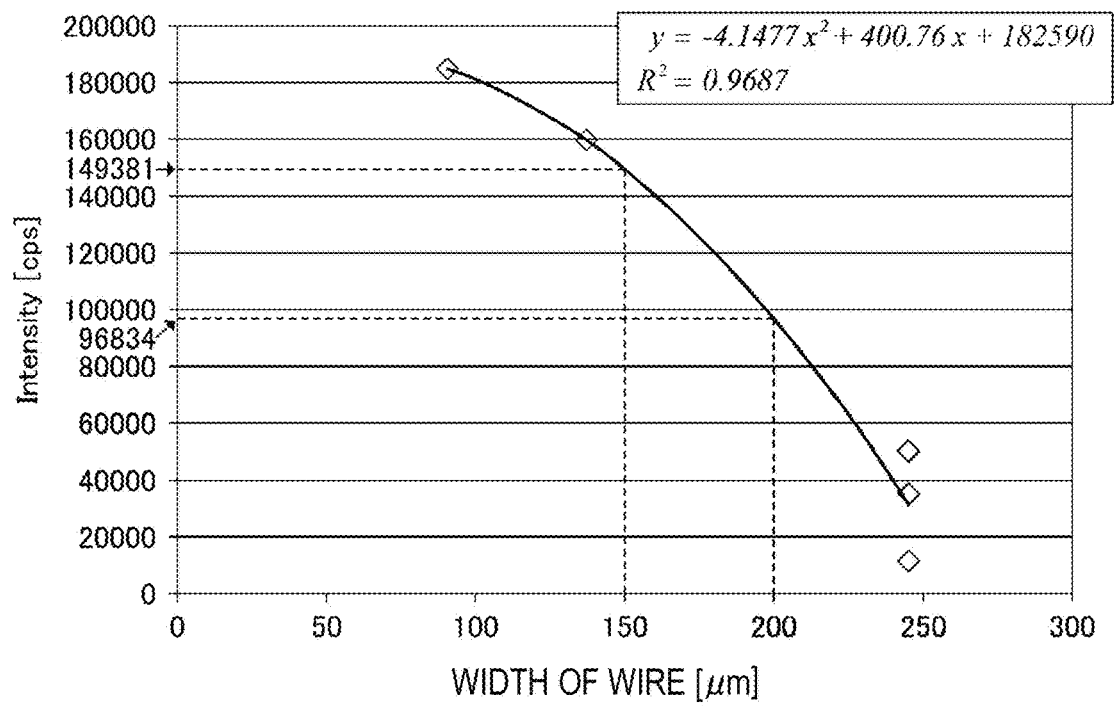
FIG. 4 is a graph illustrating a relationship between the content of fluorine in a process gas and the width of a wire.

FIG. 4 illustrates measurement results of wire widths of wire films in Examples 1-1 and 1-2 and Comparative Examples 1-1 to 1-3 and an approximate curve of a quadratic polynomial obtained from these measurement results. FIG. 4 indicates the following. By setting the detection intensity of fluorine on a surface of a PET film to 96834 [cps] or more, the wire width can be made 200 μm or less. In addition, by setting the detection intensity of fluorine on a surface of a PET film to 149381 [cps] or more, the wire width can be made 150 μm or less.

Example 2-1

A wire film was obtained in a similar manner to Example 1-1 except that a process gas containing fluorine and nitrogen at a volume ratio of 5:95 was used and the detection intensity of fluorine and the water contact angle on one surface of the PET film were set as follows.

Detection intensity of fluorine: 159645 cps Water contact angle: 100 degrees

Here, the detection intensity of fluorine was determined in a similar manner to Example 1-1. The contact angle was determined using a contact angle meter (Theta T200 Basic manufactured by Biolin Scientific).

Example 2-2

A wire film was obtained in a similar manner to Example 1-1 except that a process gas containing fluorine and nitrogen at a volume ratio of 15:85 was used and the detection intensity of fluorine and the water contact angle on one surface of the PET film were set as follows.

Detection intensity of fluorine: 174914 cps
Water contact angle: 103 degrees

Example 2-3

A wire film was obtained in a similar manner to Example 1-1 except that a process gas containing fluorine and nitrogen at a volume ratio of 25:75 was used and the detection intensity of fluorine, the water contact angle, and the arithmetic average roughness Ra on one surface of the PET film were set as follows.

Detection intensity of fluorine: 184946 cps
Water contact angle: 106 degrees
Arithmetic average roughness Ra: 1.74 nm Here, the arithmetic average roughness Ra was determined as follows. First, one surface of a PET film was observed using an atomic force microscope (AFM) (Dimension Icon manufactured by Bruker) to obtain a cross-sectional profile. Next, the arithmetic average roughness Ra was determined from the obtained cross-sectional profile according to JIS B 0601.

Comparative Example 2-1

A wire film was obtained in a similar manner to Example 1-1 except that a wire was printed with a conductive ink without subjecting one surface of a PET film to a plasma water-repellent treatment. Note that the detection intensity of fluorine, the water contact angle, and the arithmetic average roughness Ra on one surface of the PET film, the one surface not having been subjected to a plasma water-repellent treatment, were the following values.

Detection intensity of fluorine: 11444 cps
Water contact angle: 75 degrees
Arithmetic average roughness Ra: 2.26 nm (Measurement of Wire Width and Wire Thickness, and Calculation of Aspect Ratio)

First, a wire width w and a wire thickness t of a wire film were measured using a laser microscope (LEXT OLS4000 manufactured by OLYMPUS CORPORATION). Note that the wire thickness t varied in a width direction of a wire, and therefore the wire thickness t which was the maximum in the width direction of the wire was defined as the "wire thickness t". Next, an aspect ratio (t/w) was calculated using the measured wire width w and wire thickness t.

(Measurement of Resistance Value)

Wire resistance of a wire film was measured using a tester (M-03 manufactured by Custom Co., Ltd.).

(Measurement of Adhesion Force)

An adhesion force of a wire film was measured using a scratch tester.

(Result)

Figure 8:
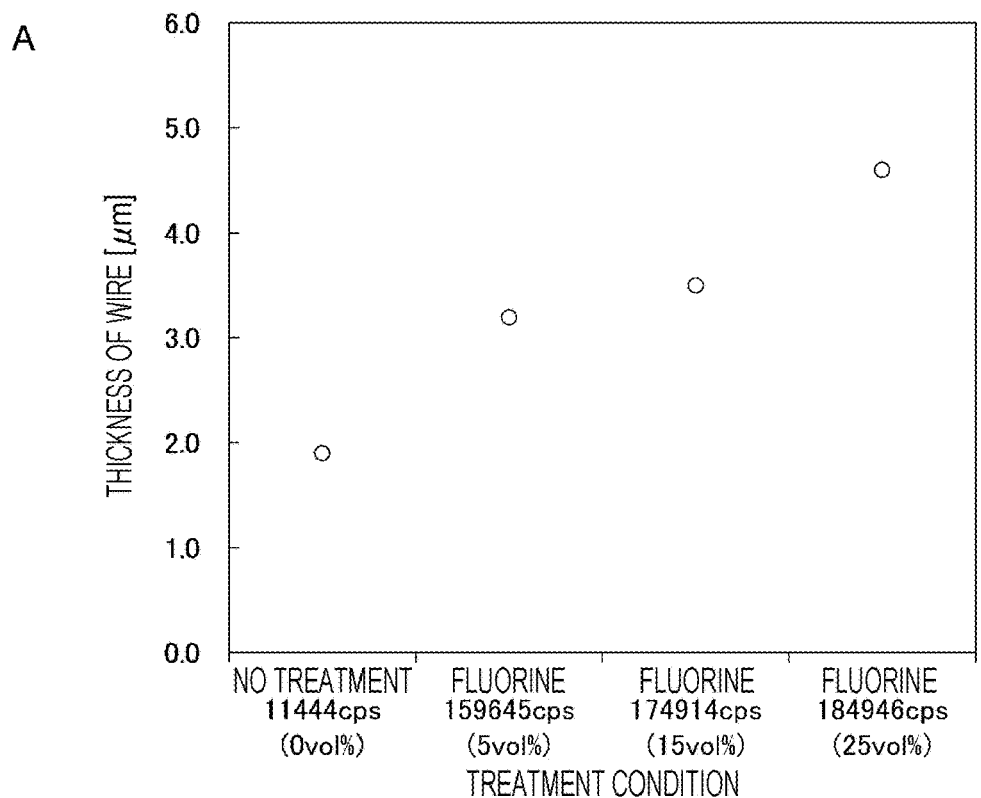
FIG. 8A is a graph illustrating a relationship between the content of fluorine in a process gas and the thickness of a wire.
FIG. 8B is a graph illustrating a relationship between the content of fluorine in a process gas and a resistance value.
Figure 8:
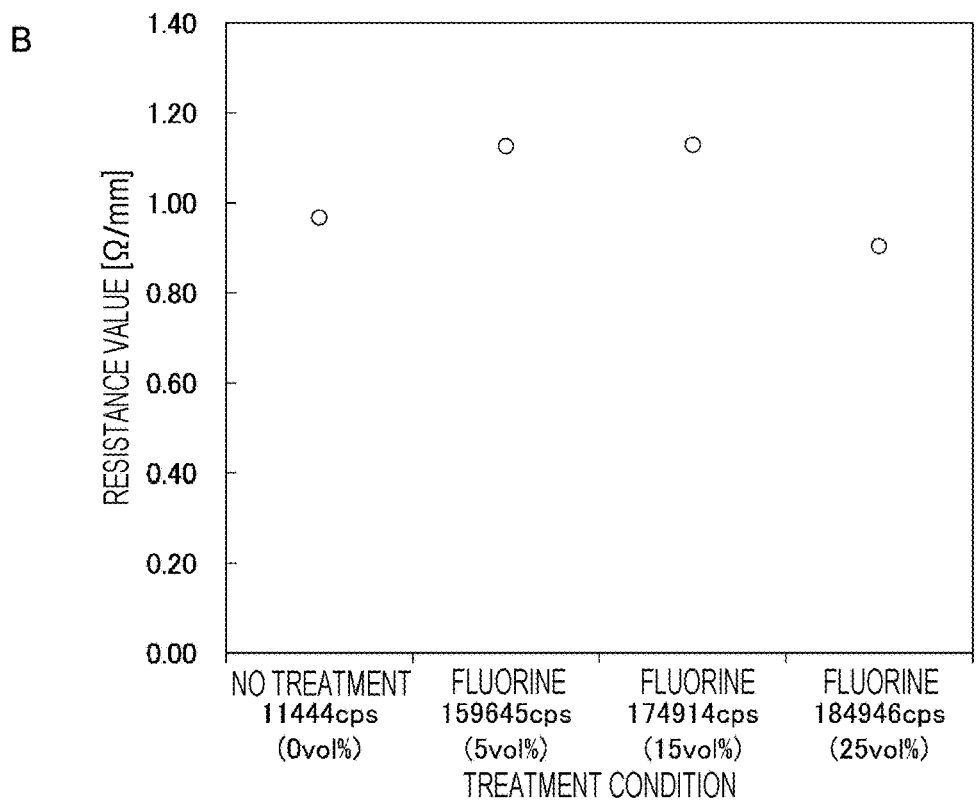

Table 1 illustrates manufacturing conditions and measurement/calculation results of wire films in Examples 2-1 to 2-3 and Comparative Example 2-1.

wire film which has not been subjected to the plasma water-repellent treatment (see FIG. 8B).

Figure 9:
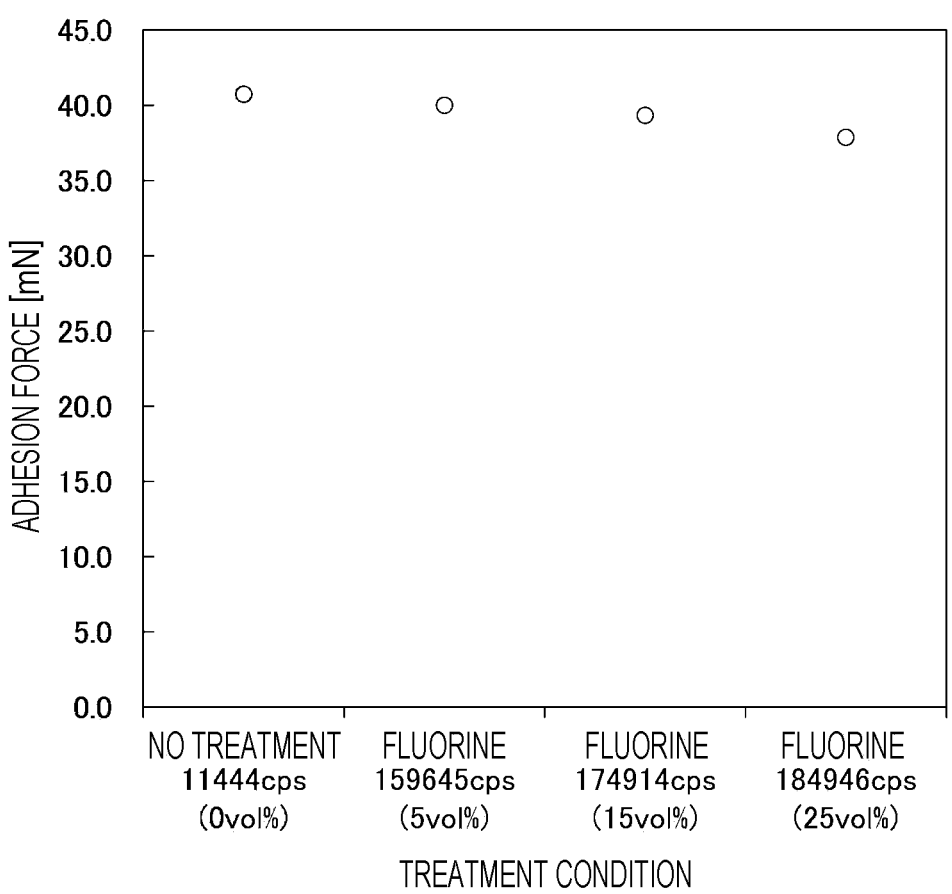
FIG. 9 is a graph illustrating a relationship between the content of fluorine in a process gas and an adhesion force.

A wire film which has been subjected to a plasma water-repellent treatment has about the same adhesion force as a wire film which has not been subjected to the plasma water-repellent treatment (see FIG. 9).

Therefore, by setting the water contact angle on one surface of a PET film to 100 degrees or more, the wire width can be made 200 μm or less, and the wire thickness can be made 1.9 μm or more. In addition, a wire film which has been subjected to a plasma water-repellent treatment can achieve both thinning (narrowing) of a wire and reduction in resistance without largely reducing an adhesion force.

Hereinabove, the embodiment of the present technology has been described specifically. However, the present technology is not limited to the above embodiment, but various modifications based on the technical idea of the present technology can be made.

For example, the configurations, the methods, the steps, the forms, the materials, the numerical values, and the like exemplified in the above embodiment are only examples, and a configuration, a method, a step, a form, a material, a numerical value, and the like different therefrom may be used, if necessary.

In addition, the configurations, the methods, the steps, the forms, the materials, the numerical values, and the like in the above embodiment can be combined to each other as long as not departing from the gist of the present technology.

TABLE 1

| | Process gas | | XPS detection amount | | | Contact | | | Wire | | | | |
|---|---|---|---|---|---|---|---|---|---|---|---|---|---|
| | Fluorine [vol %] | Nitrogen [vol %] | F1s [cps] | C1s [cps] | O1s [cps] | angle [°] | Ra [nm] | Width w [μm] | Thickness t [μm] | Aspect ratio (t/w) | Resistance value [Ω/mm] | Adhesion force [mN] |
| Example 2-1 | 5 | 95 | 159645 | 24522 | 8542 | 100 | — | 137 | 3.2 | 0.02 | 1.13 | 40 |
| Example 2-2 | 15 | 85 | 174914 | — | — | 103 | — | 99 | 3.5 | 0.04 | 1.13 | 39 |
| Example 2-3 | 25 | 75 | 184946 | 26119 | 7674 | 106 | 1.74 | 90 | 4.6 | 0.05 | 0.91 | 38 |
| Comparative Example 2-1 | — | — | 11444 | 33943 | 34209 | 75 | 2.26 | 245 | 1.9 | 0.01 | 0.97 | 40.7 |

Figure 5:
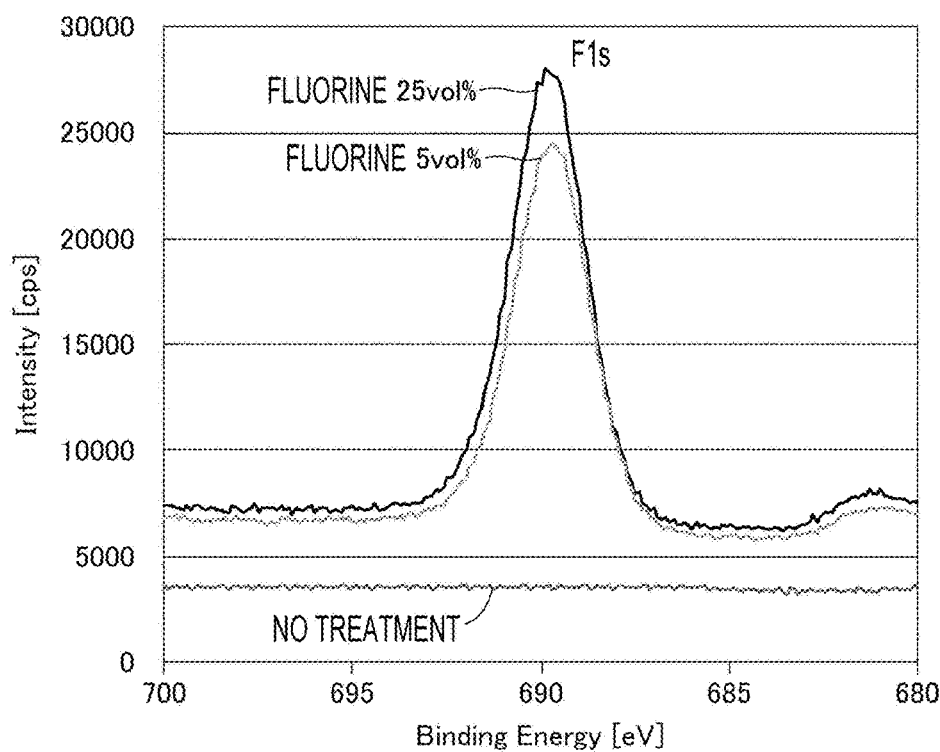
FIG. 5 is a graph illustrating an enlarged F1s peak.
Figure 6:
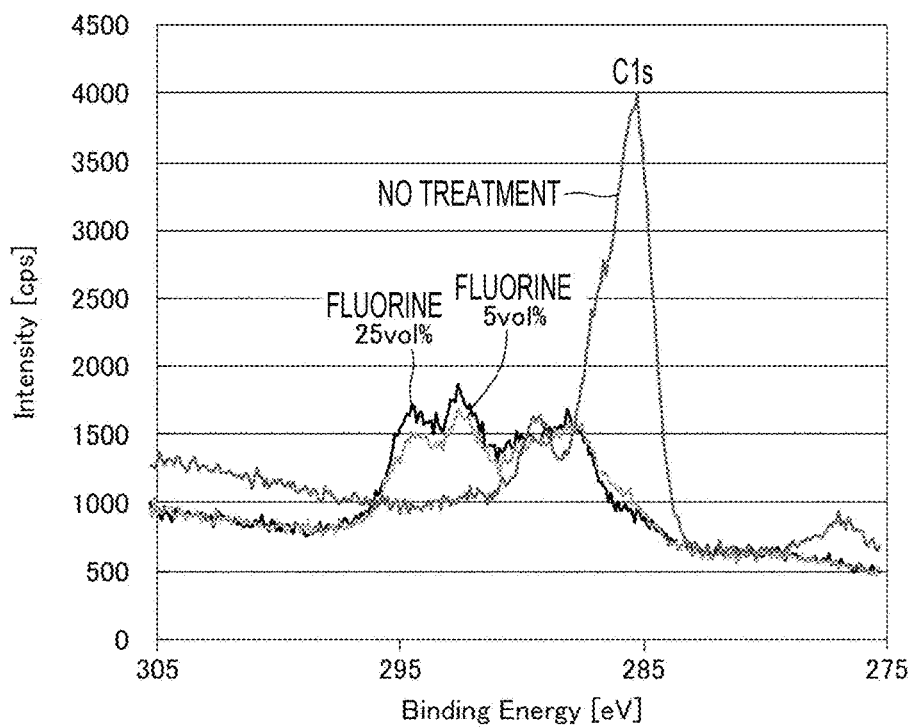
FIG. 6A is a graph illustrating an enlarged C1s peak.
FIG. 6B is a graph illustrating an enlarged O1s peak.
Figure 6:
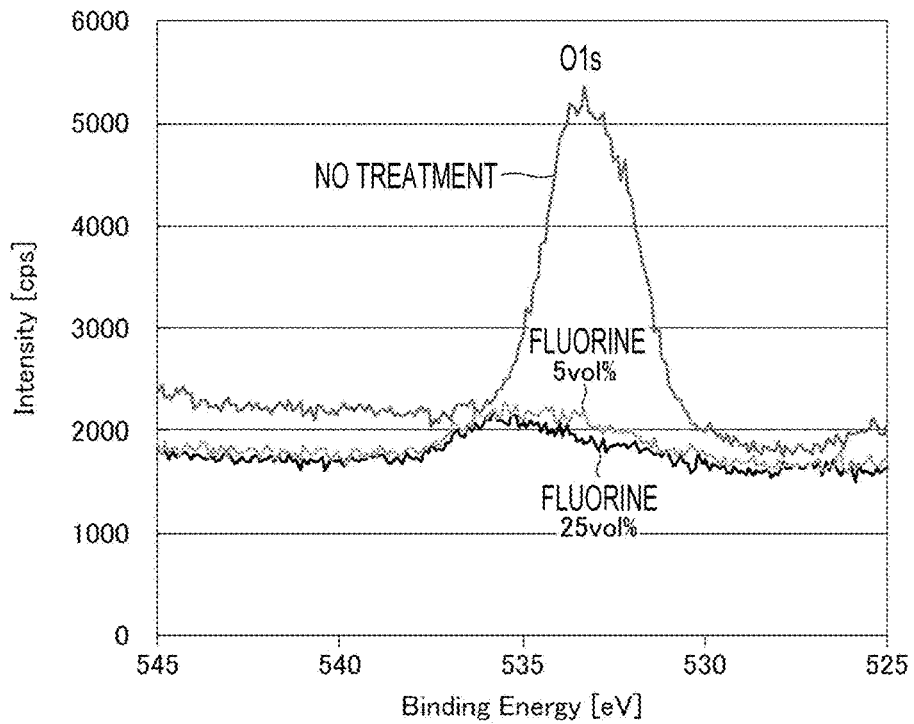
Figure 10:
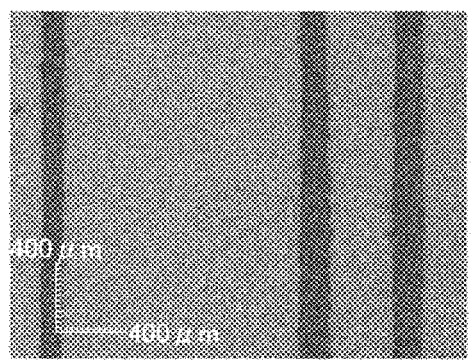
FIG. 10A is a plan view illustrating a microscope observation image of a wire film in Example 2-1.
FIG. 10B is a perspective view illustrating a microscope observation image of the wire film in Example 2-1.
FIG. 10C is a cross-sectional view taken along line XC-XC of FIG. 10B.
Figure 10:
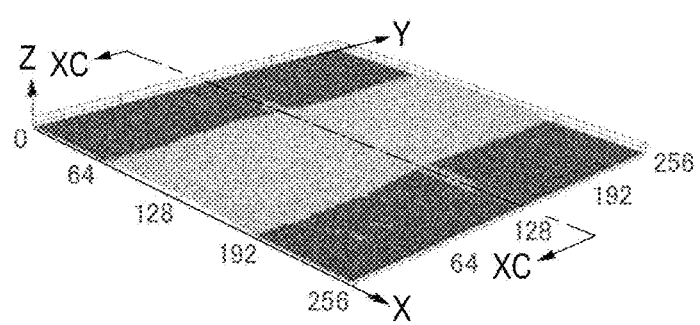
Figure 10:
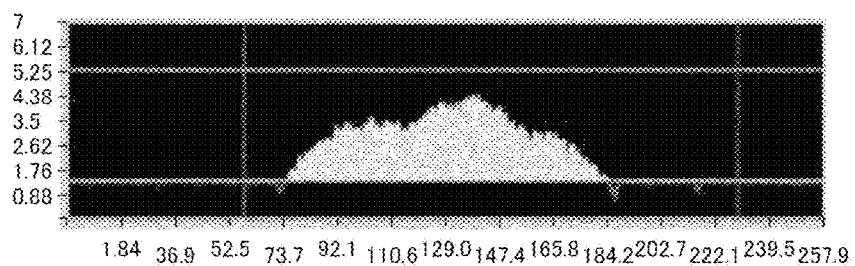
Figure 11:
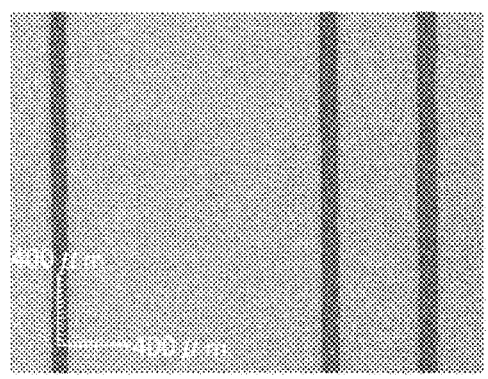
FIG. 11A is a plan view illustrating a microscope observation image of a wire film in Example 2-3.
FIG. 11B is a perspective view illustrating a microscope observation image of the wire film in Example 2-3.
FIG. 11C is a cross-sectional view taken along line XIC-XIC of FIG. 11B.
Figure 11:
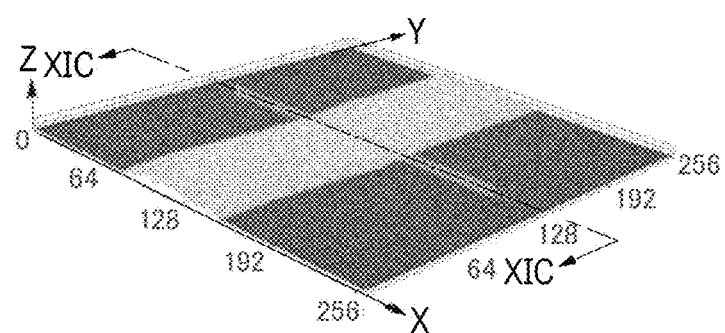
Figure 11:
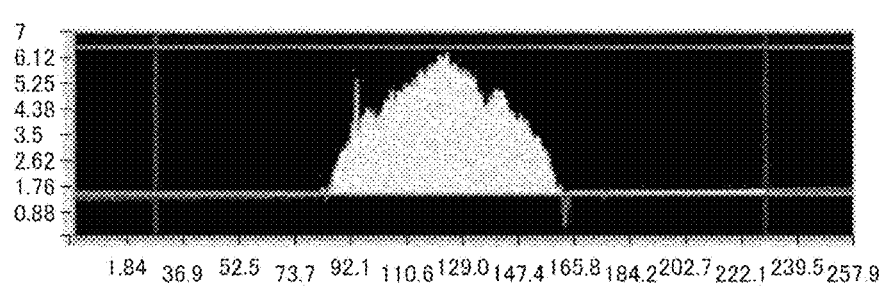
Figure 12:
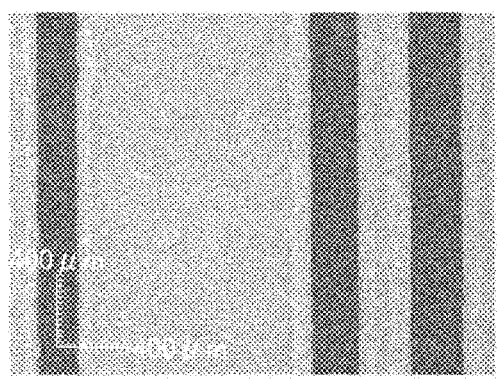
FIG. 12A is a plan view illustrating a microscope observation image of a wire film in Comparative Example 2-1.
FIG. 12B is a perspective view illustrating the microscope observation image of the wire film in Comparative Example 2-1.
FIG. 12C is a cross-sectional view taken along line XIIC-XIIC of FIG. 12B.
Figure 12:
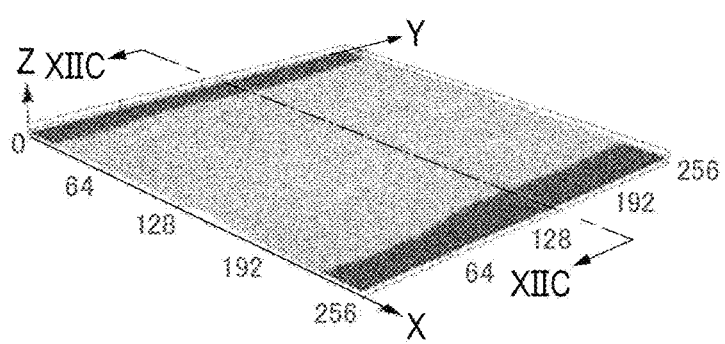
Figure 12:
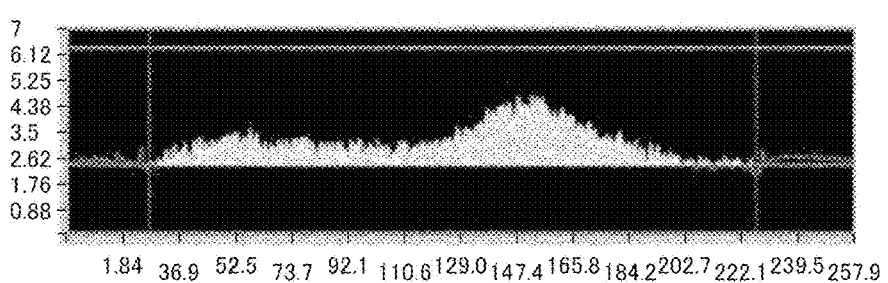
Figure 13:
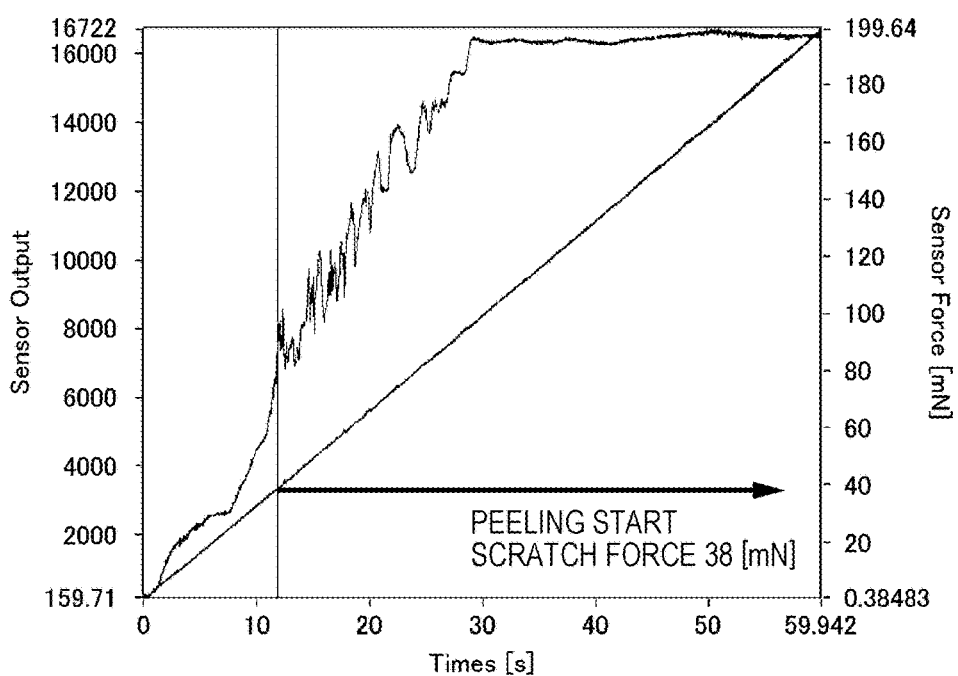
FIG. 13A is a graph illustrating a measurement result of an adhesion force of the wire film in Example 2-3.
FIG. 13B is a graph illustrating a measurement result of an adhesion force of the wire film in Comparative Example 2-1.
Figure 13:
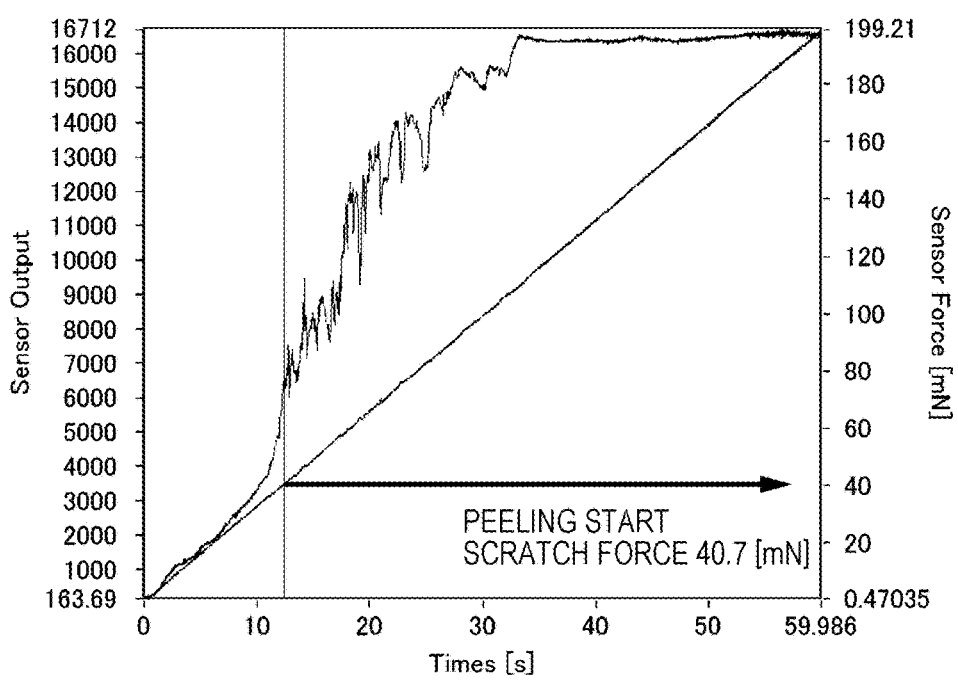

FIGS. 5, 6A, and 6B are graphs illustrating enlarged F1s, C1s, and O1s peaks, respectively. FIGS. 7A, 7B, 8A, 8B, and 9 illustrate measurement results of a contact angle, a wire width, a wire thickness, a resistance value, and an adhesion force, respectively. FIGS. 10A, 10B, and 10C illustrate microscope observation images of a wire film in Example 2-1. FIGS. 11A, 11B, and 11C illustrate microscope observation images of a wire film in Example 2-3. FIGS. 12A, 12B, and 12C illustrate microscope observation images of a wire film in Comparative Example 2-1. FIG. 13A illustrates a measurement result of an adhesion force of the wire film in Example 2-3. FIG. 13B illustrates a measurement result of an adhesion force of the wire film in Comparative Example 2-1.

The above measurement results indicate the following.

Figure 7:
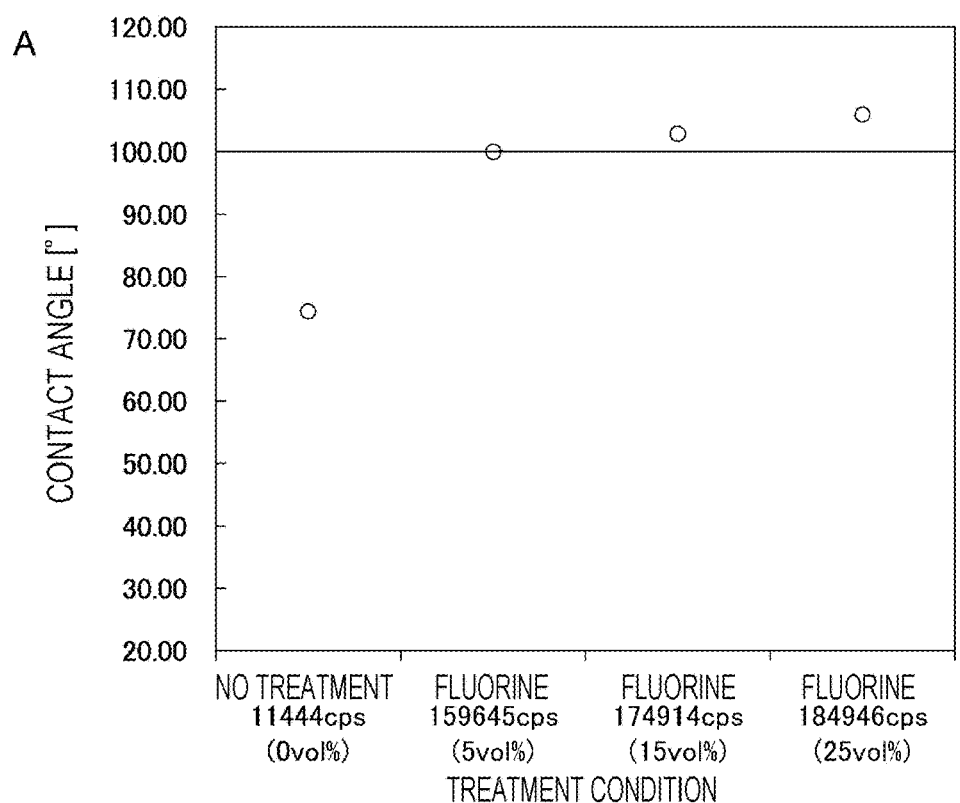
FIG. 7A is a graph illustrating a relationship between the content of fluorine in a process gas and a contact angle.
FIG. 7B is a graph illustrating a relationship between the content of fluorine in a process gas and the width of a wire.
Figure 7:
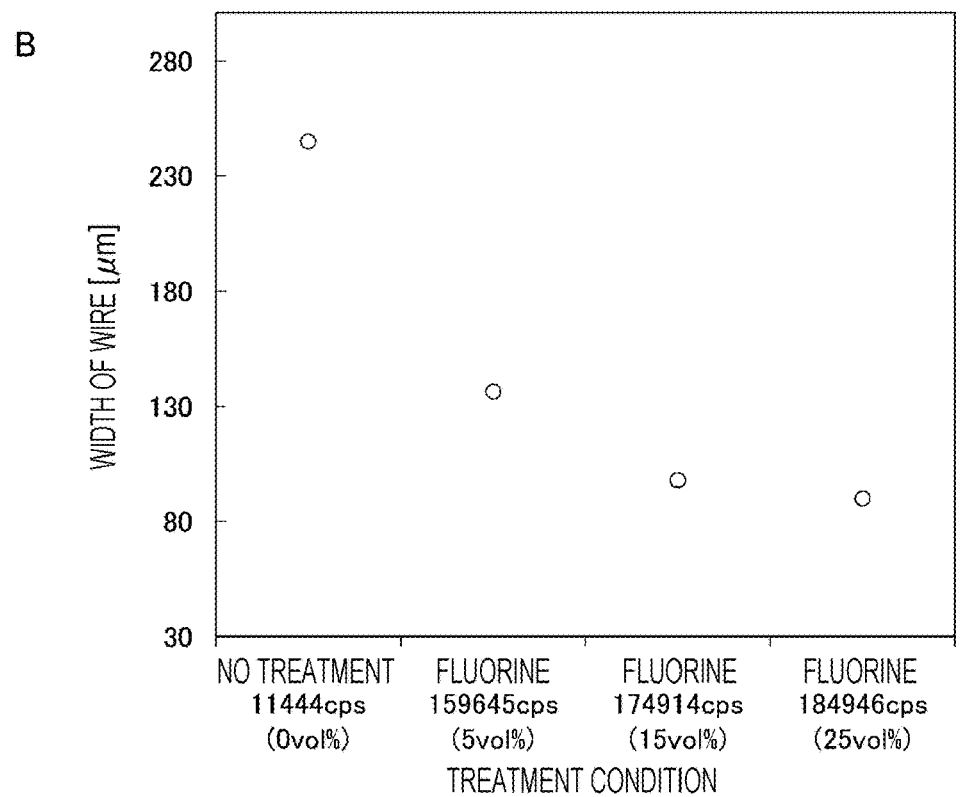

By setting the volume ratio of fluorine in a process gas to 5 vol % or more, the water contact angle on one surface of a PET film can be made 100 degrees or more (see FIG. 7A).

By setting the volume ratio of fluorine in a process gas to 5 vol % or more, the wire width can be made 200 μm or less, and the wire thickness can be made 1.9 μm or more. (See FIGS. 7B and 8A)

A wire film which has been subjected to a plasma water-repellent treatment has about the same resistance value as a In addition, the present technology can adopt the following configurations.

(1)

A conductive element including:

a base material having a fluorine-containing surface; and a wire disposed on the surface, in which detection intensity of fluorine on the surface is 96834 cps or more.

(2)

The conductive element according to (1), in which the wire has a width of 200 μm or less.

(3)

The conductive element according to (1), in which detection intensity of fluorine on the surface is 149381 cps or more.

(4)

The conductive element according to (3), in which the wire has a width of 150 μm or less.

(5)

The conductive element according to any one of (1) to (4), in which a water contact angle on the surface is 100 degrees or more.

(6)

The conductive element according to any one of (1) to (5), in which the base material contains one or more selected from polyethylene terephthalate, polyethylene, propylene, polycarbonate, polyimide, triacetylcellulose, and polyethylene naphthalate.

(7)

The conductive element according to any one of (1) to (6), in which the base material is a film.

(8)

The conductive element according to any one of (1) to (8), in which a ratio of the thickness of the wire to the width of the wire is 0.06 or more.

(9)

The conductive element according to any one of (1) to (9), in which fluorine is deposited on the surface.

(10)

A conductive element including:

a base material having a fluorine-containing surface; and a wire disposed on the surface, in which a water contact angle on the surface is 100 degrees or more.

(11)

An input device including the conductive element according to any one of (1) to (10).

(12)

An electronic apparatus including the conductive element according to any one of (1) to (10).

(13)

A method for manufacturing a conductive element, including:

subjecting a base material surface to a plasma treatment such that detection intensity of fluorine on the base material surface is 96834 cps or more; and printing a conductive ink on the base material surface which has been subjected to the plasma treatment.

(13)

A method for manufacturing a conductive element, including:

subjecting a base material surface to a plasma treatment such that a water contact angle on the base material surface is 100 degrees or more; and printing a conductive ink on the base material surface which has been subjected to the plasma treatment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 Electronic apparatus
11 Housing
12 Touch panel type display device
20 Display element
30 Input device
30a First transparent conductive element
30b Second transparent conductive element
31a, 31b Base material
32a, 32b Transparent electrode
33a, 33b Wire
34a, 34b Insulating layer

The invention claimed is:

1. A conductive element comprising:

a base material having a fluorine-containing surface; and a wire disposed on the fluorine-containing, surface, wherein detection intensity of fluorine on the fluorine-containing surface is 96834 cps or more.

2. The conductive element according to claim 1, wherein the wire has a width of 200 μm or less.

3. The conductive element according to claim 1, wherein detection intensity of fluorine on the fluorine-containing surface is 149381 cps or more.

4. The conductive element according to claim 3, wherein the wire has a width of 150 μm or less.

5. The conductive element according to claim 1, wherein a water contact angle on the fluorine-containing surface is 100 degrees or more.

6. The conductive element according to claim 1, wherein the base material contains one or more selected from polyethylene terephthalate, polyethylene, propylene, polycarbonate, polyimide, triacetylcellulose, and polyethylene naphthalate.

7. The conductive element according to claim 1, wherein the base material is a film.

8. The conductive element according to claim 1, wherein a ratio of a thickness of the wire to a width of the wire is 0.06 or more.

9. The conductive element according to claim 1, wherein fluorine is deposited on the fluorine-containing surface.

10. An input device comprising the conductive element according to claim 1.

11. An electronic apparatus comprising the conductive element according to claim 1.

* * * * *